United States Patent Office 3,378,750
Patented Apr. 16, 1968

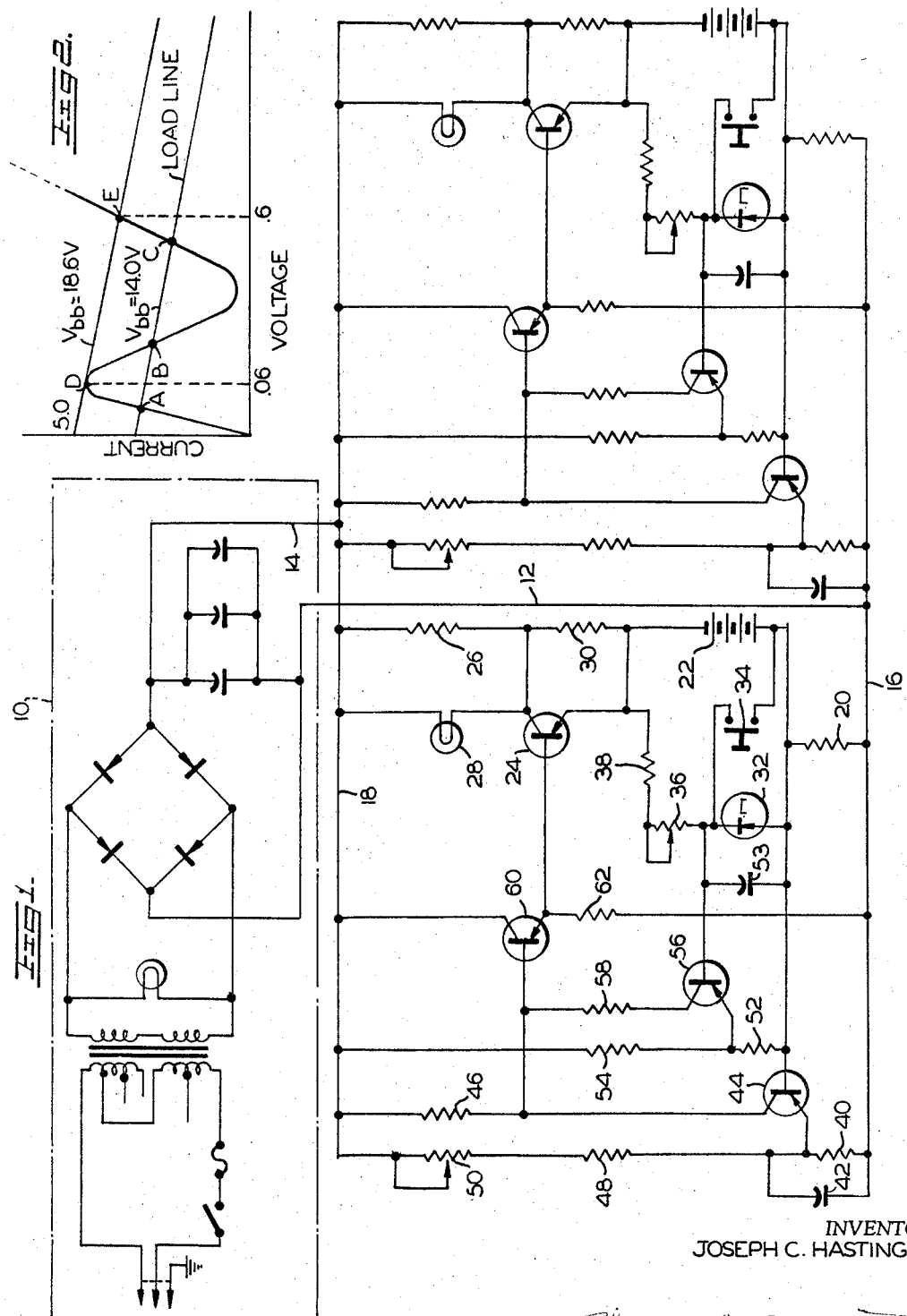

3,378,750
TUNNEL DIODE CONTROLLED BATTERY
CHARGER CIRCUIT
Joseph C. Hastings, Wayne, Pa., assignor to The Budd Company, Philadelphia, Pa., a corporation of Pennsylvania
Filed Dec. 23, 1965, Ser. No. 515,920
3 Claims. (Cl. 320—23)

ABSTRACT OF THE DISCLOSURE

A battery charger circuit includes a power source for connection to a battery through a switching circuit. The switching circuit is switched on or off by a tunnel diode switching from one state to another dependent upon the voltage at the battery. The battery is charged at a relatively constant current while charging.

---

This invention relates to a battery charger adapted to charge a battery at a constant rate until full terminal voltage is attained by the battery. More particularly, this invention relates to a battery charger employing a tunnel diode to sense the attainment of full battery charge and to discontinue charge to the battery. The tunnel diode characteristic includes two generally spaced and parallel portions and operation of the present battery charger is dependent, in part, upon which portion operation occurs.

According to the practice of this invention, a fixed rate of charge is applied to a battery and this rate in maintained by a self-regulating feature of the invention so that any increase or decrease in charging current as might be due to malfunctions of the power supply or changed E.M.F. in the battery are rapidly and automatically compensated.

Further in accordance with the practice of this invention, a tunnel diode circuit is placed in parallel across the battery which is being charged and the change of the load line with increasing battery potential as the battery charge progresses causes the tunnel diode to abruptly shift its operating point and this shift is, in turn, utilized to cut off charge to the battery. The invention employs, in its hereafter described embodiment, a plurality of transistors, several of which may be regarded as switches having various and continuously variable conduction states in addition to on-off conduction states.

In the drawings:

FIGURE 1 is a schematic view of the battery charger according to this invention.

FIGURE 2 is a typical characteristic of a tunnel diode, here shown in relation to the load line of the tunnel diode and its associated resistor circuit of this invention.

Referring now to FIGURE 1 of the drawings, the numeral 10 denotes generally an unregulated power supply of generally conventional construction. The power supply is adapted to yield a D.C. output of 28 volts from a 60 cycle, 115 volt input. The D.C. leads from the power supply 10 are denoted by the numerals 12 and 14 with the latter denoting the negative lead. For convenience in explanation, the positive lead 12 is illustrated as connected to positive line 16 while the negative lead 14 is secured to line 18. During the initial charging operation, battery 22 is generally at a potential of 14 volts and it is desired to charge this battery at the rate of one-half ampere until the potential across its terminals is 18.6 volts. At this point, the reader will appreciate that the various specific numerical values of charging current, battery potential, etc, are given by way of illustration as applied to an actual modification of the invention although it will be apparent that the invention is not limited to these particular values or parameters.

During the charge, the one-half ampere rate from power supply 10 passes from lead 12 to conduit 16 and thence through resistor 20. At this point, the current through resistor 20 divides, a portion going through tunnel diode 32 with its associated series resistors 36 (adjustable) and 38 while another portion passes through battery 22. At this time, by far the greater portion of the charging current passes through battery 22, thence through power transistor 24 and thence to line 18 through a resistor 26. The numeral 28 denotes a small lamp adapted to glow when the battery is being charged by virtue of the potential difference developed across resistor 26. The current from the negative terminal of the battery through resistor 30 may be neglected at this point since this resistance is extremely large.

At this point in the description, a discussion of the current regulating feature of the invention will be given. The numeral 40 denotes a resistor across which is secured a capacitor 42, the latter acting to shunt the power supply ripple of 120 c.p.s. from resistor 40. The upper portion of the resistance 40 is secured to the emitter of a transistor 44, the base of the latter being secured to the upper portion of resistor 20. The collector of transistor 44 goes to a resistor 46 coupled to the negative line 18. The emitter of transistor 44 is secured between resistors 40 and 48, the latter being in series with an adjustable resistor 50 which is also secured to the negative line 18 of the power supply.

Resistors 52 and 54 function to bias the emitter of transistor 56, with the top of resistor 54 being coupled to line 18. A capacitor 53 is positioned between the base of transistor 56 and the lower end of resistor 52 (hence across the diode 32) and functions to shunt or bypass any transients which might appear across the diode 32. Resistor 58 is in series with the collector of transistor 56 and is coupled to the base of transistor 60 and also to the lower portion of resistor 46. Resistor 62 is coupled at its upper end to the emitter of transistor 60 and its lower end to line 16. It will be observed that the upper portion of resistor 62 is also coupled to the base of power transistor 24, and hence transistor 60, along with resistor 62, defines an emitter follower or common collector configuration.

Assume that the battery charging cycle has just commenced and a fixed rate of one-half ampere is passing through battery 22 with the potential across battery 22 being at its lowest point or value, namely, 14 volts. Assume now that there is an (undesired) increment in the voltage output of the power supply 10. This will result in a greater potential drop across resistor 20 than before and, consequently, the forward bias of transistor 44 will increase. Increasing the forward bias of pnp transistor 44 increases the current through resistor 46 and consequently there is a greater potential drop thereacross. By virtue of the illustrated configuration of transistor 60, being a common collector configuration, a voltage increase across resistor 46 will result in a lesser emitter to base potential and the conduction of transistor 60 will decrease. Lesser conduction will decrease the potential drop through resistor 62, and this will cause the base of power transistor 24 to become more positive with respect to line 18. This, in turn, will result in a diminution of the forward bias of power transistor 24 and consequently its conduction will diminish. After the conduction of power transistor 24 has diminished sufficiently, so that the desired potential drops across resistances 20 and 40 correspond to the desired one-half ampere through battery 22, the regulating action of transistors 44 and 60 will cease.

In the event that the voltage output of power supply 10 falls below the desired level, the voltage drop across resistor 20 will decrease, this reducing the forward bias of transistor 44 with the consequent reduction in collector current in resistor 46. This reduced drop across resistor 46 effects an increased forward bias on transistor 60 with the result that more current flows through resistor 62. The larger the current through resistor 62, the more negative the base of power transistor 24 becomes relative to its emitter. Hence increased current in resistor 62 increases the forward bias of power transistor 24 thus increasing the current through it, and hence brings the battery charging current up to the desired level.

It will be observed that the potential drop across resistor 40 may be regarded as a fixed or reference potential, which is compared with a test potential drop across resistor 20. Any variation from the predetermined and hence desired ratio between these two potential drops, as would be caused by a variation in the voltage output of the supply voltage from 10, is adjusted by the above described operation so as to maintain the desired rate of battery charge. Thus, as the potential of the battery 22 increases during the charging process, the conduction of power transistor 24 increases to compensate for the increasing battery potential, which potential acts against the impressed potential of the power supply 10.

Having now described the current regulating action of the invention, further description of the circuit will now be given. Referring now to FIGURE 2 of the drawings, the well known characteristic of a tunnel diode is depicted and the lower straight line represents the load line of the diode 32 in series with resistors 36 and 38. The slope of the lower load line is the negative reciprocal of these resistances and hence the slope of the load line will remain constant after the initial setting of resistor 36. As shown, the lower load line is for the lowest battery voltage of 14 volts and is denoted by $V_{bb}$. It will be observed that the lower load line intercepts the tunnel diode characteristic at three points, points A, B, and C. Initially, with the potential of battery 22 at 14 volts, the drop across the tunnel diode is approximately .05 volt, corresponding to point A on the lower load line of FIGURE 2. Resistors 52 and 54 bias the emitter of transistor 56 at approximately .1 volt negative with respect to the base of transistor 44, while diode 14 biases the emitter at approximately 0.05 volt with respect to base of 44. Thus transistor 56 has a reverse bias of about .05 volt and is therefore cut off. Transistor 56 therefore plays no role in the previously described current regulating mode of operation of the invention.

With continuing charge of battery 22, the load line of FIGURE 2 moves gradually upward, and parallel to its lower illustrated position. However, the intercepts of the load line change with increasing potential and eventually the load line reaches the illustrated uppermost portion wherein only two points of the tunnel diode characteristic are cut, these being at points D and E. The gradual rising of the load line of FIGURE 2 results in a series of points of operation between point A and point D on the leftmost part of the diode characteristic and any slight increase of the battery potential above the load line corresponding to the desired battery potential of 18.6 volts results in diode operation at point E, which results in an abrupt potential change across the tunnel diode 32 to approximately .6 volt. This change is enough to cause the bias on the emitter-base junction of transistor 56 to swing from the reverse value of .05 volt to a forward value and place transistor 56 in saturation, with the result that there is appreciable collector current passing through resistor 58. The current now flowing in resistor 58 also flows through resistor 46 and has the effect of further decreasing the forward bias between the emitter and the base of transistor 60. This results in a substantial decrease in current through resistor 62 with the result that the base of power transistor 24 becomes more positive with respect to its emitter, thus reducing the required forward bias of pnp power transistor 24 to such an extent that it ceases to conduct. At this point, the charging operation of battery 22 stops. After the charging operation, a small current passes through resistor 30 so that the current drawn by the diode circuit will not tend to discharge the battery 22 after it has been charged.

Under certain circumstances, primarily during the temporary disconnecting of battery 22 prior to its full charge, the tunnel diode 32 will shift its operating point from A to C (FIGURE 2) and the charging will not initiate itself. In this case, the switch 34 is momentarily closed, which will cause the operating point to shift back to the desired point A for resuming charge.

The resistor 36 is adjustable to set the point of voltage cutoff with respect to the tunnel diode 32 and hence its adjustment controls, with other parameters fixed, the final value to which battery 22 will be charged. For example, if it should be desired to charge battery 22 to 25 volts (instead of 18.6 volts), resistance 36 is increased. Assuming the same initial battery potential of 14 volts, the lower load line of FIGURE 2 would have the same voltage-axis intercept of 14 volts, but its slope would be less, and point A would be slightly lower. As the battery potential increases during the charging operation, the load line will (as before) move upwardly with increasing battery charge, parallel to its original position, but here the point D would not be reached until the voltage-axis intercept of the load line reached the final 25 volts. The reader will now readily grasp that a diminution of resistance 36 would result in a lower final battery potential. Resistance 50 is adjustable to vary the amount of charging current.

As an example of circuit component values which have been successfully employed, the following table is given:

20—1.5 ohms, 5.25 watts
22—18.6 volt battery (full charge)
24—2N1540
26—4.3 ohms, 5.25 watts
30—2.2K
32—1N3716
36—1.5K
38—3.3K
40—47 ohms
42—100 mf., 12 volts
44—2N1309
46—10K
48—1.5K
50—1.5K
52—22 ohms
54—4.7K
56—2N414
58—10K
60—2N414
62—10K The power supply 10 employed in its bridge circuit four 1N4720 diodes with the capacitors being 500 mf. at a rating of 50 volts, with the power supply yielding 28 volts output.

From an inspection of FIGURE 1, it will be observed that the circuit illustrated exhibits symmetry about the midpoint and represents a device for charging, in practice, two batteries. Obviously, the above description of the left hand circuit is sufficient for an understanding of this invention. Further, it will be understood that the tunnel diode 32 is intended to yield the illustrated plural-slope characteristic of FIGURE 2 wherein operation swings abruptly from one positive slope portion to another positive slope portion and hence any other element which yields such a characteristic may be employed for the tunnel diode 32.

I claim:
1. A battery charger including;
 (a) a source of unidirectional potential,
 (b) a pair of terminals across which a battery is adapted to be connected for charging,

(c) a power transistor in series with said terminal pair and said source of voltage, (d) a tunnel diode in series with a first resistance connected across said terminal pair, (e) a second and normally cut-off transistor having two terminals connected across said diode, (f) a third transistor, (g) said third transistor changing its conduction in accordance with the ratio between a reference voltage and a test voltage, (h) said test voltage being produced by the passage of current through a second resistance, (i) said reference voltage being produced by the passage of current through a third resistance, (j) a fourth transistor, (k) said third and fourth transistors being coupled with the conduction state of said fourth transistor controlled by the conduction state of said third transistor, (l) said normally cut-off transistor being also coupled to said fourth transistor, (m) said fourth transistor being coupled to said power transistor, (n) whereby the state of conduction of said power transistor is determined by the conduction of said third transistor acting on said fourth transistor to thereby maintain the charging current to a battery adapted to be coupled between said terminal pair at a predetermined value, and whereby the attainment of a predetermined charge by battery adapted to be placed between said terminal pair causes the potential drop across said tunnel diode to abruptly change and to cause said second and normally cut-off transistor to conduct and to thereby cut-off conduction of said power transistor by acting through said fourth transistor.

2. A battery charger including:

(a) a source of unidirectional potential, (b) a first resistance in series with a tunnel diode, (c) said first resistance and said tunnel diode being in series with a pair of terminals adapted to receive a battery thereacross, (d) a first switch in series with said pair of terminals and with said source of potential, (e) cut-off means coupled to said diode for changing the state of conduction of said first switch upon an abrupt increase of potential across said diode occasioned by build-up of a battery connected across the terminal pair to a desired final charge value, (f) said cut-off means includes a second switch, the conduction state of said second switch controlling the conduction state of said first switch, the conduction state of said second switch being responsive to an abrupt change of potential across said diode, (g) a third switch, said second switch being coupled to said first switch through a third switch, with said third switch being directly coupled to said first switch.

3. The battery charger of claim 2 including:

(a) a second resistance, in parallel with said first switch, whereby after the conduction of the first switch ceases a small charging current through a battery coupled across the terminal pair will flow to preclude discharge of the battery through the diode and first resistance.

References Cited

UNITED STATES PATENTS

| | | | |
|---|---|---|---|
| 3,018,432 | 1/1962 | Palmer | 320—39 X |
| 3,204,174 | 8/1965 | Clerc | 323—22 |
| 3,310,729 | 3/1967 | Burgess et al. | 323—22 X |

JOHN F. COUCH, *Primary Examiner.*

S. WEINBERG, *Assistant Examiner.*